United States Patent
Ekonen et al.

(10) Patent No.: US 9,193,263 B2
(45) Date of Patent: *Nov. 24, 2015

(54) AWD VEHICLE WITH DISCONNECT SYSTEM

(71) Applicant: Magna Powertrain of America, Inc., Troy, MI (US)

(72) Inventors: Todd Ekonen, Howell, MI (US); Bradley Larkin, Shelby Township, MI (US); Douglas Bradley, Sterling Heights, MI (US)

(73) Assignee: Magna Powertrain of America, Inc., Troy, MI (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/108,666

(22) Filed: Dec. 17, 2013

(65) Prior Publication Data

US 2014/0100077 A1   Apr. 10, 2014

Related U.S. Application Data

(63) Continuation of application No. 13/144,439, filed as application No. PCT/US2010/021572 on Jan. 21, 2010, now Pat. No. 8,608,611.

(60) Provisional application No. 61/145,985, filed on Jan. 21, 2009.

(51) Int. Cl.
*B60K 23/08*   (2006.01)
*B60K 17/35*   (2006.01)
*B60K 17/344*   (2006.01)

(52) U.S. Cl.
CPC ............... *B60K 23/08* (2013.01); *B60K 17/35* (2013.01); *B60K 23/0808* (2013.01); *B60K 17/344* (2013.01); *Y10T 74/19074* (2015.01); *Y10T 477/606* (2015.01)

(58) Field of Classification Search
CPC ... B60K 23/08; B60K 23/0808; B60K 17/344
See application file for complete search history.

(56) References Cited

U.S. PATENT DOCUMENTS

| | | | |
|---|---|---|---|
| 2,136,692 | A | 11/1938 | Johnson |
| 2,228,581 | A | 1/1941 | Olen |
| 4,817,753 | A | 4/1989 | Hiketa |

(Continued)

FOREIGN PATENT DOCUMENTS

| | | | |
|---|---|---|---|
| GB | 2407804 A | | 5/2005 |
| JP | 2002370557 | * | 12/2002 |

(Continued)

*Primary Examiner* — Sherry Estremsky
(74) *Attorney, Agent, or Firm* — Dickinson Wright PLLC

(57) ABSTRACT

A vehicle drive train for transferring torque to first and second sets of wheels includes a first driveline adapted to transfer torque to the first set of wheels and a synchronizing clutch. A second driveline is adapted to transfer torque to the second set of wheels and includes a power disconnection device and a friction clutch. A hypoid gearset is positioned within the second driveline in a power path between the synchronizing clutch and the power disconnection device. The friction clutch and the power disconnection device are positioned on opposite sides of the hypoid gearset. The hypoid gearset is selectively disconnected from being driven by the first driveline, the second driveline or the wheels when the synchronizing clutch and the power disconnection device are operated in disconnected, non-torque transferring, modes.

24 Claims, 6 Drawing Sheets

(56) References Cited

U.S. PATENT DOCUMENTS

| | | |
|---|---|---|
| 5,105,901 A | 4/1992 | Watanabe et al. |
| 5,411,110 A | 5/1995 | Wilson et al. |
| 5,522,776 A | 6/1996 | Alvey |
| 5,651,749 A | 7/1997 | Wilson et al. |
| 5,916,052 A | 6/1999 | Dick |
| 6,001,041 A | 12/1999 | Sawase et al. |
| 6,605,018 B2 | 8/2003 | Palazzolo |
| 7,150,694 B2 | 12/2006 | Mizon et al. |
| 8,177,672 B2 * | 5/2012 | Kato et al. ............. 475/198 |
| 8,534,409 B2 | 9/2013 | Sigmund et al. |
| 8,608,611 B2 | 12/2013 | Ekonen et al. |
| 2002/0177501 A1 * | 11/2002 | Turner et al. ............. 475/198 |
| 2011/0179906 A1 | 7/2011 | Juenemann et al. |
| 2014/0135168 A1 * | 5/2014 | Yokoo ............................. 477/8 |

FOREIGN PATENT DOCUMENTS

| | | |
|---|---|---|
| JP | 2002370557 A | 12/2002 |
| KR | 1007492160000 | 8/2007 |

* cited by examiner

AWD VEHICLE WITH DISCONNECT SYSTEM

CROSS-REFERENCE TO RELATED APPLICATIONS

This application is a continuation of U.S. Ser. No. 13/144,439 filed Jul. 13, 2011 which is a U.S. national stage of International Application No. PCT/US2010/021572 filed Jan. 21, 2010 which claims the benefit of U.S. Provisional Ser. No. 61/145,985 filed Jan. 21, 2009. The entire disclosure of each of the above-noted applications is incorporated herein by reference.

FIELD

The present disclosure relates to a driveline for a motor vehicle having a system for disconnecting a hypoid ring gear from rotating at driveline speed. In particular, a power take-off unit includes a coupling for ceasing the transfer of torque from a power source to a rear driveline while another disconnect selectively interrupts the flow of power from a vehicle wheel to a hypoid ring gear of the rear driveline. A torque coupling selectively connects a portion of rear driveline with an input to the hypoid ring gear.

BACKGROUND

Typical power take-off units transfer power from a transaxle in receipt of torque from a vehicle power source. The power take-off unit transfers power to a propeller shaft through a gear arrangement that typically includes a hypoid cross-axis gearset. Other gear arrangements such as parallel axis gears may be provided within the power take-off unit to provide additional torque reduction.

Power take-off units have traditionally been connected to the transaxle output differential. Accordingly, at least some of the components of the power take-off unit rotate at the transaxle differential output speed. Power losses occur through the hypoid gear churning through a lubricating fluid. Efficiency losses due to bearing preload and gear mesh conditions are also incurred while the components of the power take-off unit are rotated.

Similar energy losses occur when other driveline components are rotated. For example, many rear driven axles include hypoid gearsets having a ring gear at least partially immersed in a lubricating fluid. In at least some full-time all-wheel drive configurations, the rear drive axle hypoid gearset continuously rotates during all modes of operation and transmits a certain level of torque. In other applications, the rear axle hypoid gearset still rotates but with out the transmission of torque whenever the vehicle is moving. Regardless of the particular configuration, churning losses convert energy that could have been transferred to the wheels into heat energy that is not beneficially captured by the vehicle. As such, an opportunity may exist to provide a more energy efficient vehicle driveline.

SUMMARY

A vehicle drive train for transferring torque to first and second sets of wheels includes a first driveline adapted to transfer torque to the first set of wheels and a synchronizing clutch. A second driveline is adapted to transfer torque to the second set of wheels and includes a power disconnection device and a friction clutch. A hypoid gearset is positioned within the second driveline in a power path between the synchronizing clutch and the power disconnection device. The friction clutch and the power disconnection device are positioned on opposite sides of the hypoid gearset. The hypoid gearset is selectively disconnected from being driven by the first driveline, the second driveline or the wheels when the synchronizing clutch and the power disconnection device are operated in disconnected, non-torque transferring, modes.

Furthermore, a vehicle drive train for transferring torque from a power source to first and second sets of wheels includes a first driveline adapted to transfer torque from the power source to the first set of wheels and includes a power take-off unit. The first driveline includes a differential, a first hypoid gearset and a synchronizer positioned between the differential and the first hypoid gearset to selectively transfer or cease the transfer of torque from the power source to the first hypoid gearset. A second driveline is in receipt of torque from the first hypoid gearset and transfers torque to the second set of wheels. The second driveline includes a power disconnection device selectively interrupting the transfer of torque from the second set of wheels to the first hypoid gearset. The second driveline also includes a friction clutch for transferring torque between the first hypoid gearset and a second hypoid gearset associated with the second driveline.

Furthermore, a method for transferring torque from a power source to a first pair and a second pair of wheels in a vehicle drive train is disclosed. The method includes transferring torque from the power source to the first pair of wheels through a first transmission device. A synchronizing clutch, within the first power transmission device, is actuated to transfer torque to a driveline interconnecting the first pair and second pair of wheels. A friction clutch is subsequently actuated to transfer torque from the driveline to a rear drive axle to initiate rotation of a gearset within the rear drive axle. The method further includes actuating a disconnect to drivingly interconnect a shaft coupled to one wheel of the second pair of wheels and a rotatable member of the rear drive axle once speed synchronization between the components coupled by the disconnect is achieved.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
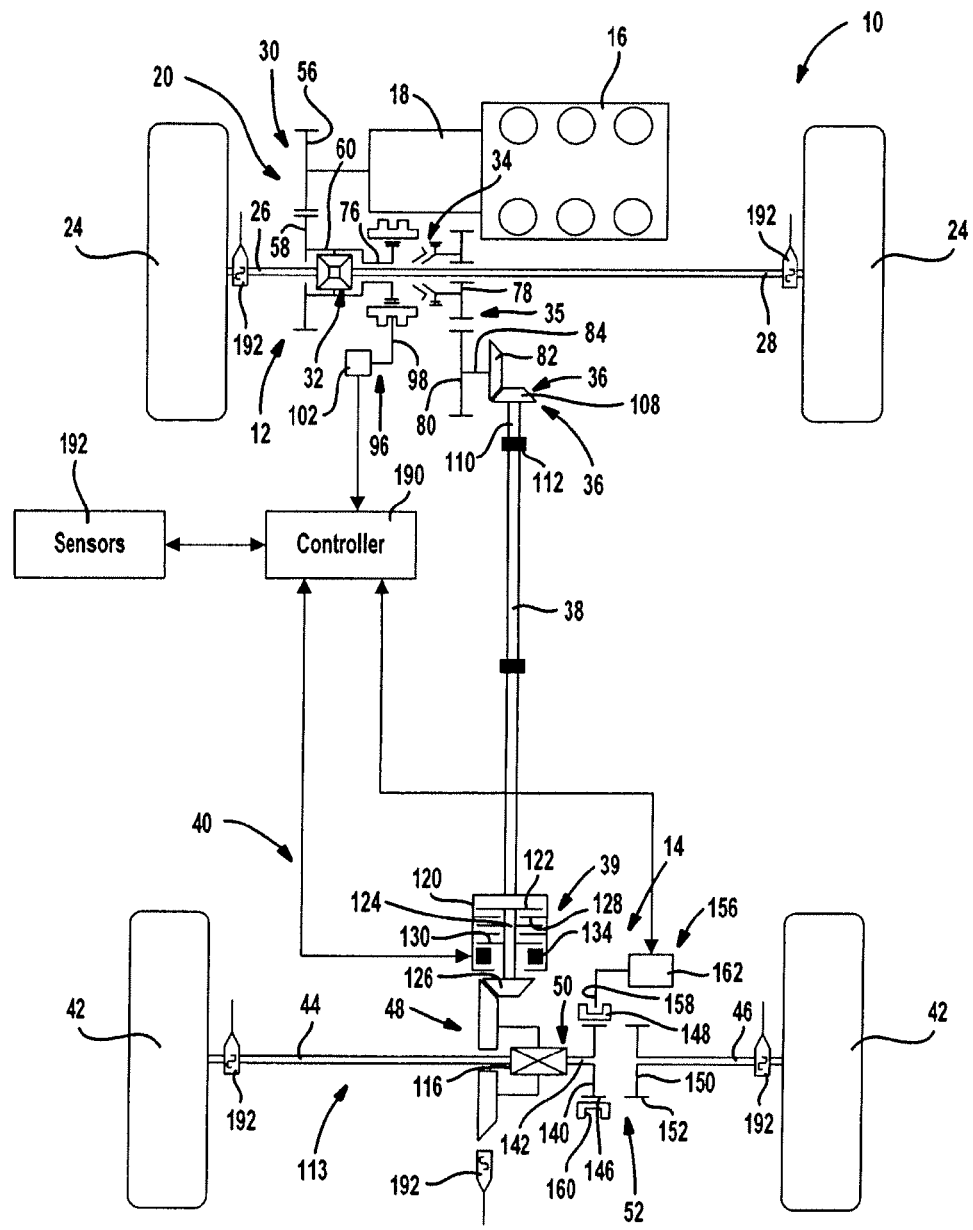
FIG. 1 is a schematic of an exemplary vehicle equipped with a vehicle drive train of the present disclosure.

The following description is merely exemplary in nature and is not intended to limit the present disclosure, application, or uses. It should be understood that throughout the drawings, corresponding reference numerals indicate like or corresponding parts and features.

In general, the present disclosure relates to a coupling and hypoid disconnect system for a driveline of a motor vehicle. A power take-off unit may be equipped with a synchronizer to disconnect the power source from a portion of the driveline and to reconnect through synchronization of the driveline. A dog or roller-type clutch may be provided to disconnect a portion of the driveline from one or more of the vehicle wheels. Additionally, a friction coupling may be positioned in series within the driveline to provide speed synchronization between front and rear driveline components when a power reconnection is desired. The hypoid gearing of the vehicle driveline may be separated from the driving source of power to reduce churning losses and other mechanical inefficiencies.

Figure 2:
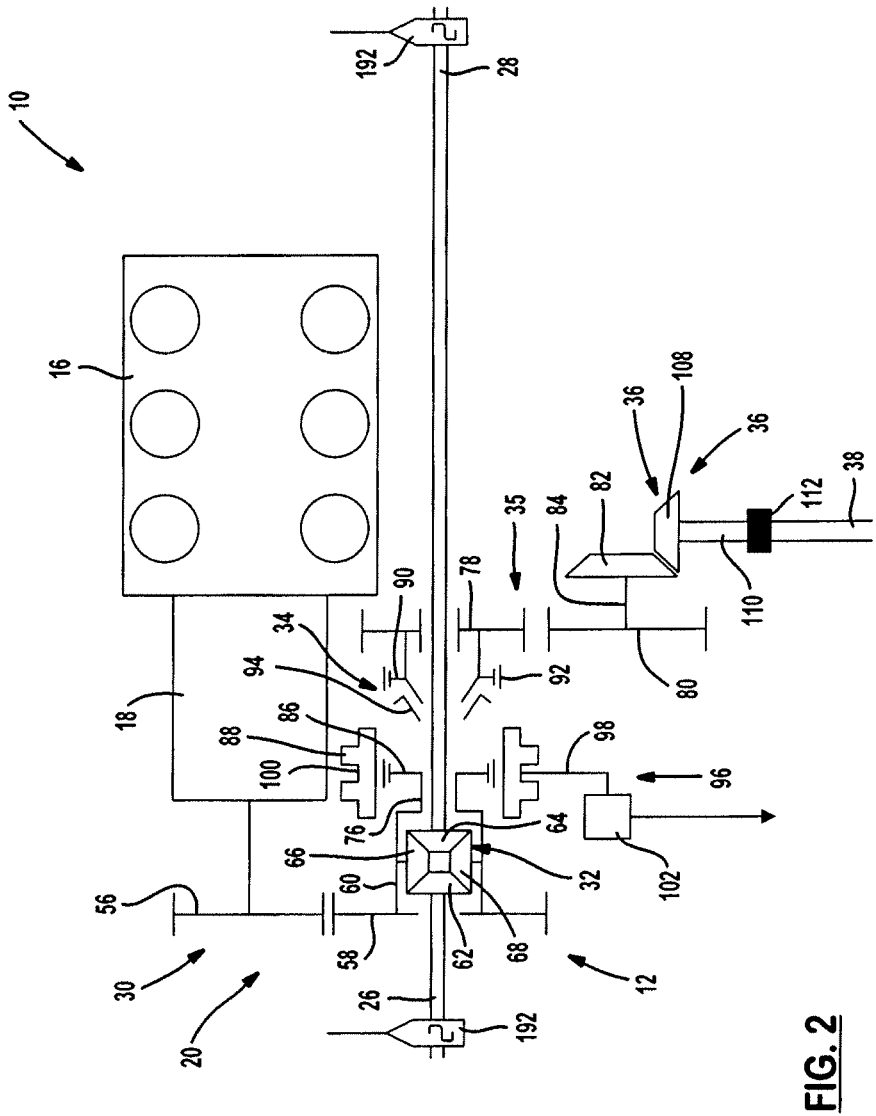
FIG. 2 is an enlarged schematic depicting a portion of the drive train shown in FIG. 1.
Figure 3:
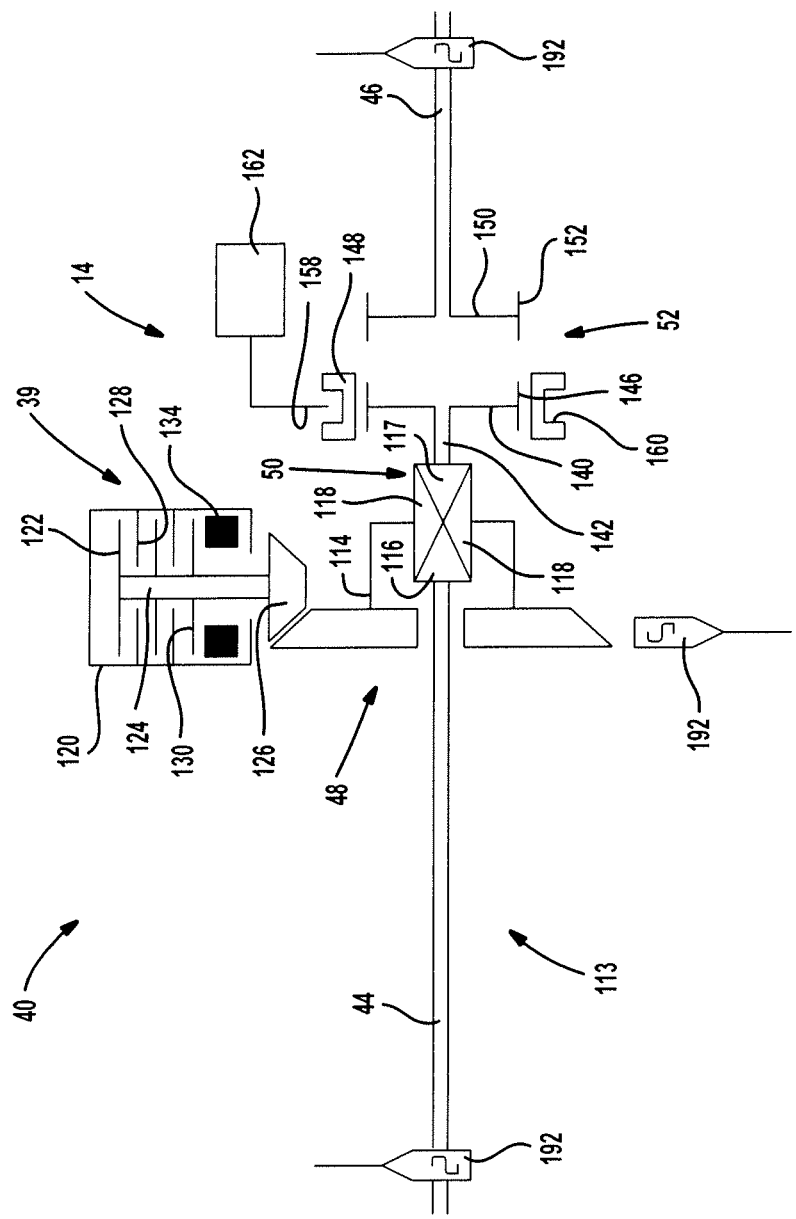
FIG. 3 is an enlarged schematic depicting another portion of the drive train shown in FIG. 1.

With particular reference to FIGS. 1-3 of the drawings, a drive train 10 of a four-wheel drive vehicle is shown. Drive train 10 includes a front driveline 12 and a rear driveline 14 both drivable from a source of power, such as an engine 16 through a transmission 18 which may be of either the manual or automatic type. In the particular embodiment shown, drive train 10 is a four-wheel system incorporating a power transmission device 20 for transmitting drive torque from engine 16 and transmission 18 to front driveline 12 and rear driveline 14. Power transmission device 20 is shown as a power take-off unit.

Front driveline 12 is shown to include a pair of front wheels 24 individually driven by a first front axle shaft 26 and a second front axle shaft 28, as well as a differential assembly 32. Power take-off unit 20 includes a reduction speed gearset 30, a synchronizer clutch 34, an output gearset 35 and a right-angled drive assembly 36.

Rear driveline 14 includes a propeller shaft 38 connected at a first end to right-angled drive assembly 36 and at an opposite end to one side of a friction coupling 39. The opposite side of friction coupling 39 is connected to a rear axle assembly 40. Rear driveline 14 also includes a pair of rear wheels 42 individually driven by a first rear axle shaft 44 and a second rear axle shaft 46. Rear axle assembly 40 also includes a hypoid ring and pinion gearset 48 driving a differential assembly 50. A disconnect 52 selectively drivingly disconnects second rear axle shaft 46 from ring and pinion gearset 48 and differential assembly 50.

Reduction speed gearset 30 of power take-off unit 20 includes a drive gear 56 fixed for rotation with an output shaft of transmission 18. A driven gear 58 is in constant meshed engagement with drive gear 56 and is also fixed for rotation with a carrier 60 of differential assembly 32. Differential assembly 32 includes a first side gear 62 fixed for rotation with first front axle shaft 26 and a second side gear 64 fixed for rotation with second front axle shaft 28. Each of first and second side gears 62, 64 are in meshed engagement with pinion gears 66, 68 which are rotatably supported by carrier 60.

Power take-off unit 20 also includes an input shaft 76 supported for rotation within a housing. Input shaft 76 is fixed for rotation with carrier 60 of center differential assembly 32. A drive gear 78 is supported for rotation on second front axle shaft 28. A driven gear 80 is in meshed engagement with drive gear 78 and fixed for rotation with a ring gear 82 of right-angled drive assembly 36. Driven gear 80 and ring gear 82 are fixed for rotation with a countershaft 84. Synchronizer clutch 34 selectively drivingly interconnects input shaft 76 and drive gear 78. Synchronizer clutch 34 includes a hub 86 fixed for rotation with input shaft 76. An axially moveable sleeve 88 is in splined engagement with hub 86. A second hub 90 is fixed for rotation with drive gear 78 and includes an external spline 92. Synchronizer clutch 34 also includes a blocker ring 94 positioned between hub 86 and second hub 90. Blocker ring 94 functions to assure that the rotational speed of input shaft 76 is substantially the same as drive gear 78 prior to allowing a driving connection between hub 86 and second hub 90 via sleeve 88. It should be appreciated that an alternate synchronizer (not shown) may not require a blocker ring to function properly.

A synchronizer clutch actuation mechanism 96 includes a shift fork 98 slidingly positioned with a groove 100 formed in sleeve 88. An actuator 102 is operable to move fork 98 and sleeve 88 from a first position where sleeve 88 is disengaged from spline 92 and a second position where sleeve 88 concurrently drivingly engages hub 86 and second hub 90.

Right-angled drive assembly 36 includes ring gear 82 and a pinion gear 108 in meshed engagement with ring gear 82. Pinion gear 108 may be integrally formed with a pinion shaft 110. Pinion shaft 110 is fixed for rotation with propeller shaft 38 via a flange 112. Synchronizer clutch 34 may be placed in an activated mode where torque is transferred between input shaft 76 and drive gear 78. Synchronizer clutch 34 is also operable in a deactivated mode where no torque is transferred to rear driveline 14. Power from engine 16 is not transferred to right-angled drive assembly 36 when synchronizer clutch 34 is in the deactivated mode.

Friction coupling 39 is depicted as a friction clutch fixed to a rear axle assembly 113. Rear axle assembly 113 includes differential assembly 50, rear axle shaft 44, rear axle shaft 46 and disconnect 52. Differential assembly 50 includes a carrier housing 114 fixed for rotation with a ring gear 115 of ring and pinion gearset 48. Differential assembly 50 also includes first and second side gears 116, 117 fixed for rotation with first and second rear axle shafts 44, 46, respectively. A pair of pinion gears 118 are positioned within carrier housing 114 and placed in constant meshed engagement with side gears 116, 117. Friction coupling 39 includes a drum 120 fixed for rotation with propeller shaft 38. A hub 122 is fixed for rotation with a pinion shaft 124. A pinion gear 126 of pinion gearset 48 may be integrally formed with pinion shaft 124. Outer clutch plates 128 are splined for rotation with drum 120. A plurality of inner clutch plates 130 are splined for rotation with hub 122 and interleaved with outer clutch plates 128. An actuator 134 is operable to apply a clutch actuation force to clutch plates 128, 130 and transfer torque through friction coupling 39. In one example, an axially moveable piston may be in receipt of pressurized fluid to provide the actuation force. Alternatively, an electric motor may cooperate with a force multiplication mechanism. In yet another embodiment described below in greater detail, the friction clutch may be actuated based on wheel slip or a difference in rotational speed across the friction clutch.

Disconnect 52 is depicted in FIGS. 1 and 3 as a dog clutch. Disconnect 52 includes a first hub 140 fixed for rotation with a shaft 142 drivingly engaged with side gear 117 of differential assembly 50. An external spline 146 is formed on first hub 140. An axially translatable sleeve 148 is in splined engagement with first hub 140. A second hub 150 is fixed for rotation with rear axle shaft 46. A spline 152 is formed on an outer periphery of second hub 150.

A dog clutch actuation system 156 includes a fork 158 slidably positioned within a groove 160 formed in sleeve 148. An actuator 162 is operable to translate fork 158 and sleeve 148 between a first position where sleeve 148 is engaged only with first hub 140 and a second position where sleeve 148 simultaneously engages splines 146 and 152 to drivingly interconnect shaft 142 with rear axle shaft 46.

Figure 3A:
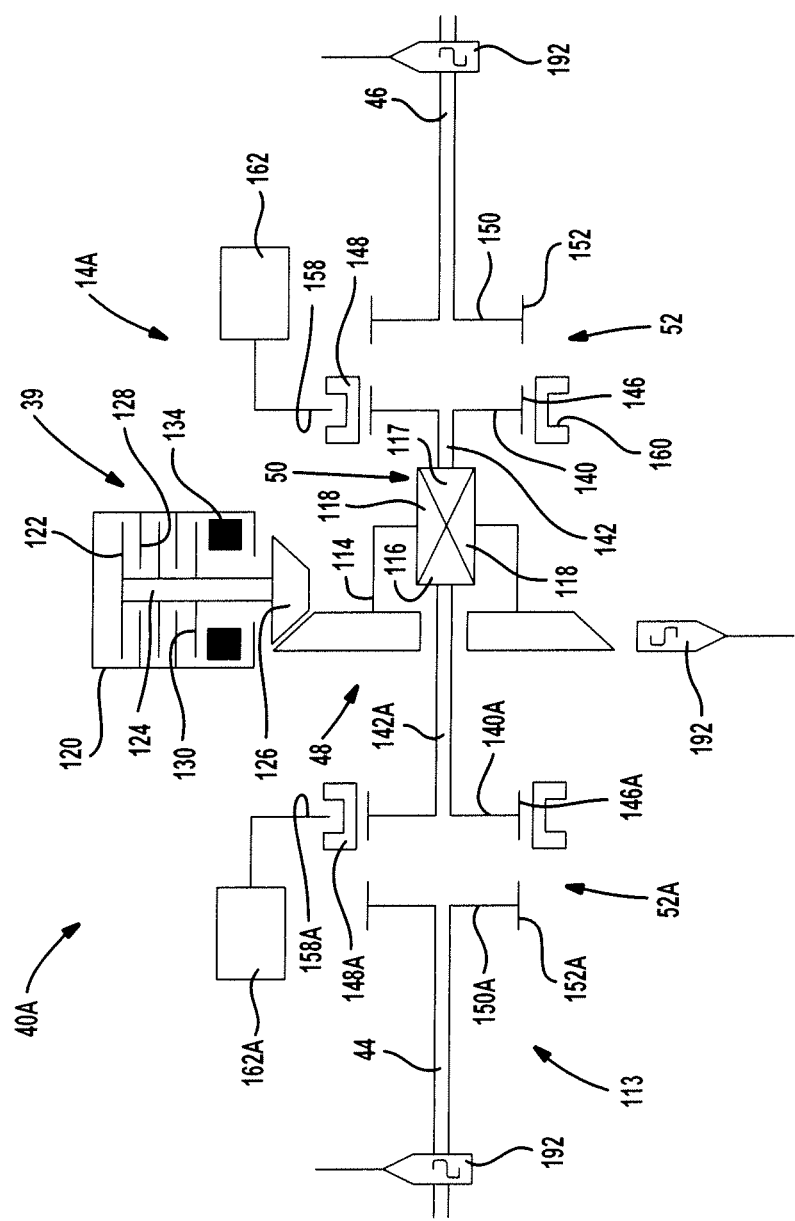
FIG. 3A is an enlarged schematic depicting an alternate portion of the drive train shown in FIG. 1.

FIG. 3A depicts an alternate rear driveline 14A and rear axle assembly 40A. Rear axle assembly 40A is substantially similar to rear axle assembly 40, previously described. Accordingly, like elements will retain their previously introduced reference numerals. Rear axle assembly 40A includes another disconnect identified as disconnect 52A. The elements of disconnect 52A are identified in similar fashion to the components of disconnect 52 except that the suffix "A" has been added. Disconnect 52A may selectively drivingly connect and disconnect rear axle shaft 44 with an axle shaft portion 142A that is fixed for rotation with side gear 116. During operation, ring and pinion gearset 48 and differential assembly 50 may be entirely disconnected from rear axle shaft 44 and rear axle shaft 46. Accordingly, even the internal components of differential assembly 50 will not be rotated due to input from rear wheels 42. To return to the all wheel drive mode of operation, actuator 162A is controlled at substantially the same time as actuator 162 to reconnect shaft 142A and rear axle shaft 44 in the same manner as shaft 142 is coupled to rear axle shaft 46.

Figure 4:
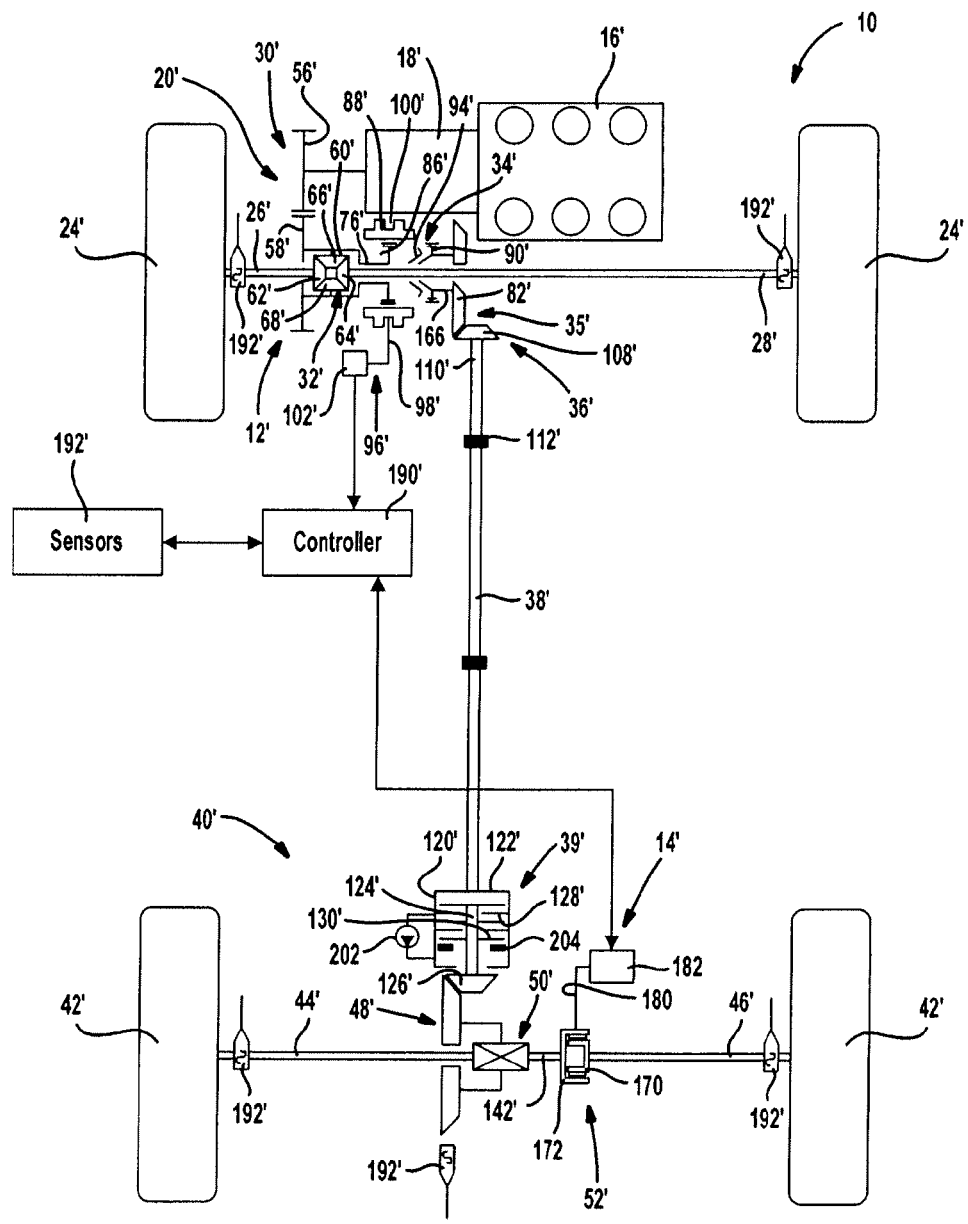
FIG. 4 is a schematic of another exemplary vehicle equipped with another alternate drive train.
Figure 5:
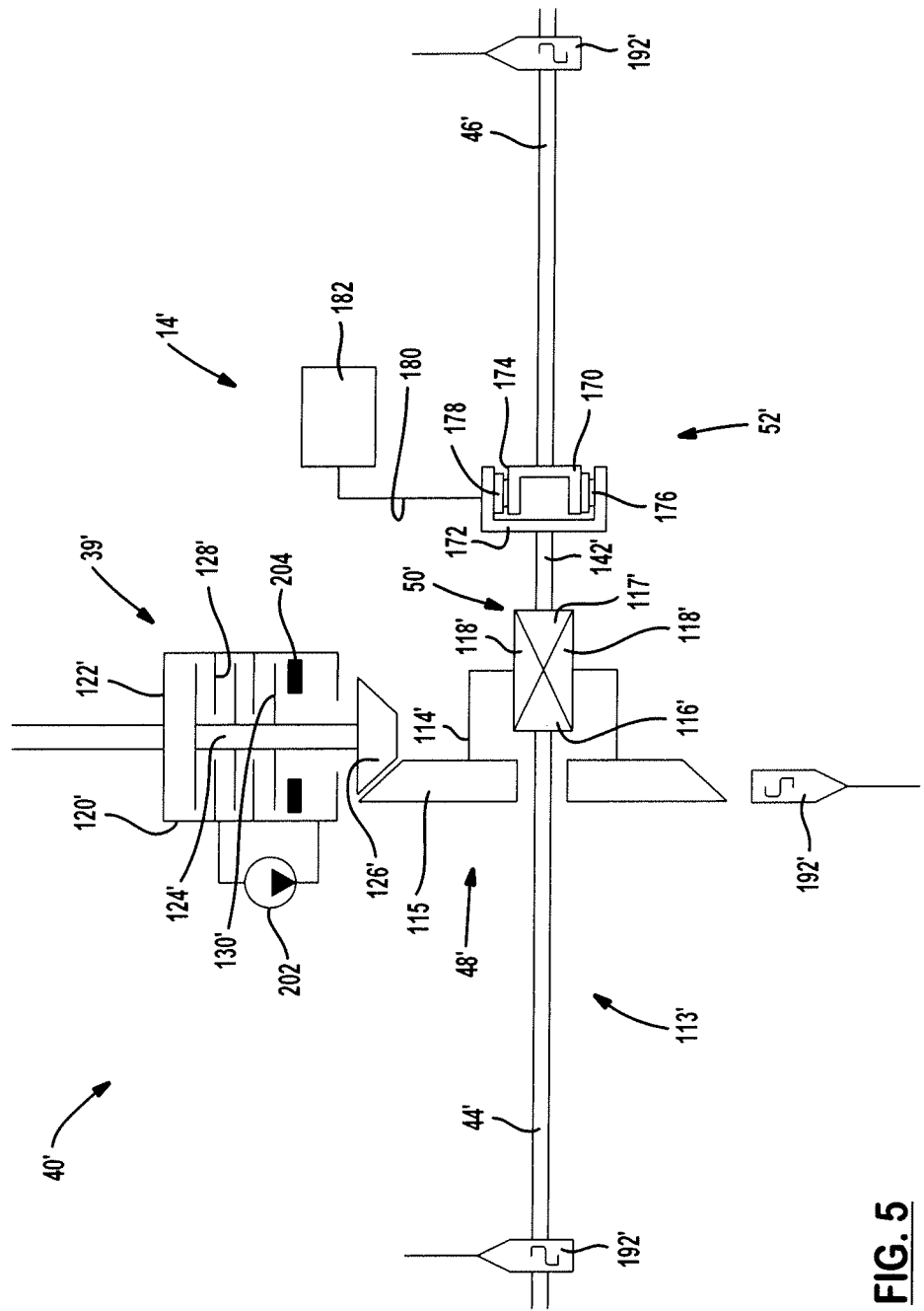
FIG. 5 is an enlarged schematic depicting a portion of the drive train depicted in FIG. 4.

FIGS. 4 and 5 depict an alternate drive train 10'. Drive train 10' is substantially similar to drive train 10. As such, like elements will be identified with the previously introduced reference numerals including a prime suffix. Drive train 10' includes a power take-off unit 20' that differs from power take-off unit 20 by being a single axis power transmission device that does not include countershaft 84, previously described. On the contrary, power take-off unit 20' includes a concentric shaft 166 having ring gear 82' fixed thereto. Ring gear 82' is in meshed engagement with pinion gear 108' to drive propeller shaft 38'.

FIGS. 4 and 5 also show that disconnect 52 may be alternatively formed as a roller clutch identified as reference numeral 52'. The driveline depicted in FIGS. 1 and 4 may include either a dog clutch, a roller clutch or one of a number of other power transmission devices operable to selectively transfer torque and cease the transfer of torque between rotary shafts. In the example depicted, roller clutch 52' includes an inner member 170 fixed for rotation with rear axle shaft 46' and an outer member 172 fixed for rotation with shaft 142'. Inner member 170 includes a surface 174 having a plurality of curved recesses. Each recess is in receipt of a roller 176. A split ring 178 is positioned between rollers 176 and outer member 172. Split ring 178 also includes a plurality of curved recesses facing the recesses of inner member 170 and in receipt of rollers 176. A control arm 180 cooperates with split ring 178 to restrict or permit relative rotation between inner member 170 and split ring 178. When relative rotation is permitted, rollers 176 are forced radially outwardly to radially outwardly expand split ring 178 into engagement with outer member 172 to transfer torque across roller clutch 52'. When relative rotation between inner member 170 and split ring 178 is restricted, rollers 176 are not displaced, the rollers are not wedged between split ring 178 and inner member 170 and torque is not transferred across disconnect 52'. An actuator 182 may move control arm 180 to operate disconnect 52'.

During vehicle operation, it may be advantageous to reduce the churning losses associated with driving ring and pinion gearset 48 as well as right-angled drive assembly 36. With reference to FIG. 1, a controller 190 is in communication with a variety of vehicle sensors 192 providing data indicative of parameters such as vehicle speed, four-wheel drive mode, wheel slip, vehicle acceleration and the like. One sensor 192 may be positioned at a location proximate ring and pinion gearset 48 to provide a signal indicating the rotational speed of a ring and pinion gearset component. At the appropriate time, controller 190 may output a signal to control actuator 96 and place synchronizer clutch 34 in the deactuated mode where torque is not transferred from engine 16 to rear driveline 14. Controller 190 may also signal actuator 162, associated with disconnect 52, to place fork 158 in a position to cease torque transfer across disconnect 52 such that the energy associated with one of rotating rear wheels 42 will not be transferred to ring and pinion gearset 48 or differential assembly 50. Accordingly, the hypoid gearsets 36, 48 will not be driven by differential assembly 32. Furthermore, because side gear 116 is not restricted from rotation, input torque provided by rear axle shaft 44 will only cause the internal gears within differential assembly 50 to rotate. Ring and pinion gearset 48 is not driven. It should be appreciated that friction coupling 39 may be operated in either of an open mode or a torque transferring mode when synchronizer clutch 34 and disconnect 52 do not transfer torque because rear driveline 14 is not rotating at this time.

When controller 190 determines that a four wheel drive mode of operation is to commence, controller 190 signals actuator 102 to slide sleeve 88 toward hub 90. During this operation, speed synchronization between input shaft 76 and drive gear 78 occurs. Once the speeds are matched, sleeve 88 drivingly interconnects hub 86 and second hub 90. At this time, right-angled drive assembly 36 is also driven by engine 16. Once the front driveline components and the right-angled drive components are up to speed, controller 190 provides a signal to actuator 134 to begin speed synchronization of ring and pinion gearset 48 as well as differential assembly 50. This sequence of operations will cause the speed of shaft 142 to match the speed of rear axle shaft 46. At this time, controller 190 provides a signal to actuator 162 to place disconnect 52 in a torque transferring mode by axially translating sleeve 148. At the end of this sequence, drive train 10 is operable in an all wheel drive mode. It should be appreciated that the procedure previously described may be performed while the vehicle is moving.

It is contemplated that friction coupling 39 may be alternatively configured as a passive device having an actuation system operable in response to a speed differential between propeller shaft 38 and pinion shaft 124. In particular, FIG. 4 depicts friction coupling 39' including a pump 202 driven by propeller shaft 38 when a speed differential exists between propeller shaft 38' and pinion shaft 124. Pressurized fluid from pump 202 is provided to a piston 204 for applying a compressive force to inner clutch plates 130' and outer clutch plates 128'. In this arrangement, control of synchronizer clutch 34' also provides control of friction coupling 39' because rotation of propeller shaft 38' relative to pinion shaft 124' will cause pressurized fluid to cause torque transfer across friction coupling 39' thereby quickly achieving speed synchronization of the front driveline and rear driveline components. Furthermore, the inclusion of friction coupling 39 or 39' allows synchronizer clutch 34 or 34' to be relatively minimally sized because only some of the components of power transmission device 20 and propeller shaft 38 are speed synchronized through actuation of synchronizer clutch 34. The relatively large rotating masses within rear axle assembly 40 are accelerated through actuation of friction coupling 39.

While a number of vehicle drivelines have been previously described, it should be appreciated that the particular configurations discussed are merely exemplary. As such, it is contemplated that other combinations of the components shown in the Figures may be arranged with one another to construct a drive train not explicitly shown but within the scope of the present disclosure.

What is claimed is:

1. A drivetrain for a motor vehicle having a power source and first and second sets of wheels, the drivetrain comprising:
a first driveline adapted to normally transfer drive torque from the power source to the first set of wheels, the first driveline including a first differential assembly having a first differential input component driven by a drive gear of the power source and a pair of first differential output components interconnected to the first set of wheels;
a second driveline adapted to selectively transfer drive torque from the power source to the second set of wheels, the second driveline including a first hypoid gearset, a first disconnect coupling operable for selectively connecting and disconnecting the first hypoid gearset to the first differential input component of the first differential assembly, a propshaft driven by the first hypoid gearset, a second differential assembly having a second differential input component driven by a second hypoid gearset and a pair of second differential output components interconnected to the second set of wheels, a torque coupling for selectively connecting and disconnecting the propshaft to the second hypoid gearset, and a second disconnect coupling for selectively connecting and disconnecting one of the second differential output components of the second differential assembly to its corresponding one of the second set of wheels; and
a control system for controlling actuation of the first disconnect coupling, the torque coupling and the second disconnect coupling for selectively switching the vehicle between a two-wheel drive mode and an all-wheel drive mode, wherein the control system is operable to shift the vehicle from the two-wheel drive mode into the all-wheel drive mode by sequentially actuating the first disconnect coupling to synchronize the rotary speed of the first hypoid gearset with the rotary speed of the first differential input component, actuating the torque coupling to synchronize the rotary speed of the second hypoid gearset with the rotary speed of the first hypoid gearset, and actuating the second disconnect coupling to connect the one of the second differential output components of the second differential assembly to the corresponding one of the second set of wheels.

2. The drivetrain of claim 1 wherein the second driveline includes an input shaft driven by the first differential input component, wherein the first disconnect coupling connects the input shaft to the first hypoid gearset prior to actuation of the torque coupling, wherein the torque coupling can be released after the second disconnect coupling connects the one of the second differential output components of the second differential assembly to the corresponding one of the second set of wheels, and wherein the actuated state of the torque coupling can be subsequently modulated following the initial release to vary the magnitude of drive torque transferred from the power source to the second set of wheels.

3. The drivetrain of claim 1 wherein the second driveline includes a power take-off unit, wherein the first disconnect coupling and the first hypoid gearset are positioned within the power take-off unit, and wherein the first disconnect coupling is a clutch having a clutch sleeve axially moveable between a first position and a second position, the clutch sleeve being operable in its first position to disconnect an input member of the first hypoid gearset from a drive shaft connected to the first differential input component of the first differential assembly, and the clutch sleeve being operable in its second position to drivingly connect the input member of the first hypoid gearset to the drive shaft.

4. The drivetrain of claim 3 wherein the first hypoid gearset includes a first ring gear that is meshed with a first pinion gear drivingly connected to a first end of the propshaft, wherein the input member of the first hypoid gearset includes a transfer gearset having a first transfer gear fixed for rotation with the first ring gear and a second transfer gear meshed with the first transfer gear, and wherein the clutch sleeve is operable in its first position to release the second transfer gear from driven connection with the drive shaft and is operable in its second position to drivingly couple the second transfer gear to the drive shaft.

5. The drivetrain of claim 1 wherein the second driveline further includes a third disconnect coupling operable for selectively connecting and disconnecting the other one of the second differential output components of the second differential assembly to the other one of the second set of wheels, and wherein the control system is operable to control actuation of the third disconnect coupling.

6. The drivetrain of claim 1 wherein the torque coupling is a multiplate friction clutch having a first clutch member fixed for rotation with the propshaft, a second clutch member fixed for rotation with an input component of the second hypoid gearset, a clutch pack disposed between the first and second clutch members, and an actuator operable to exert a clutch engagement force on the clutch pack.

7. The drivetrain of claim 1 wherein the second disconnect coupling is a dog clutch having a clutch sleeve moveable between first and second positions, the clutch sleeve is operable in its first position to release the one of the second differential output components of the second differential assembly from driven engagement with an axle shaft drivingly connected to the one of the second pair of wheels, the clutch sleeve is operable in its second position to couple the one of the second differential output components of the second differential assembly for driven rotation with the axle shaft.

8. A drivetrain for a motor vehicle having a power source and first and second sets of wheels, the drivetrain comprising:
a first driveline adapted to normally transfer drive torque from the power source to the first set of wheels, the first driveline including a drive gear for transferring drive torque from the power source to a first differential assembly operably interconnected to the first set of wheels;
a second driveline adapted to selectively transfer drive torque from the power source to the second set of wheels, the second driveline including a first hypoid gearset, a first disconnect coupling operable for selectively connecting and disconnecting the first hypoid gearset with the drive gear, a propshaft driven by the first hypoid gearset, a second hypoid gearset driving a second differential assembly operably interconnected to the second set of wheels, a torque coupling operable for transferring drive torque from the propshaft to the second hypoid gear, and a second disconnect coupling operable for selectively connecting and disconnecting the second set of wheels with the second hypoid gearset; and
a control system for controlling actuation of at least the first and second disconnect couplings to selectively switch the vehicle between a two-wheel drive mode and an all-wheel drive mode, wherein the first and second hypoid gearsets and the propshaft are disconnected from the power source and the second set of wheels when the first and second disconnect couplings are operated in disconnected, non-torque transferring modes to establish the two-wheel drive mode, and wherein the vehicle is shifted from the two-wheel drive mode into the all-wheel drive mode by actuating the first disconnect coupling and subsequently actuating the second disconnect clutch.

9. The drivetrain of claim 8 wherein the control system is further operable to control actuation of the torque coupling, and wherein the torque coupling is actuated prior to actuation of the second disconnect coupling during a switch from the two-wheel drive mode into the all-wheel drive mode.

10. The drivetrain of claim 9 wherein the control system is operable to shift the vehicle from the two-wheel drive mode into the all-wheel drive mode by sequentially actuating the first disconnect coupling to synchronize the rotary speed of the first hypoid gearset with the rotary speed of the drive gear, actuating the torque coupling to synchronize the rotary speed of the second hypoid gearset with the rotary speed of the first hypoid gearset, and actuating the second disconnect coupling to connect the second differential assembly to the second set of wheels.

11. The drivetrain of claim 10 wherein the first disconnect coupling connects the drive gear to the first hypoid gearset prior to actuation of the torque coupling, wherein the torque coupling can be released after the second disconnect coupling connects the second differential assembly to the second set of wheels, and wherein the actuated state of the torque coupling can be subsequently modulated following the initial release to vary the magnitude of drive torque transferred from the power source to the second set of wheels.

12. The drivetrain of claim 8 wherein the second driveline includes a power take-off unit, wherein the first disconnect coupling and the first hypoid gearset are positioned within the power take-off unit, and wherein the first disconnect coupling is a synchronizer clutch having a clutch sleeve axially moveable between a first position and a second position, the clutch sleeve being operable in its first position to disconnect an input member of the first hypoid gearset from a drive shaft connected to at least one of the drive gear and a differential input component of the first differential assembly, and the clutch sleeve being operable in its second position to drivingly connect the input member of the first hypoid gearset to the drive shaft.

13. The drivetrain of claim 8 wherein the second driveline further includes a third disconnect coupling operable for selectively connecting and disconnecting the second differential assembly to the second set of wheels, and wherein the control system is operable to control actuation of the third disconnect coupling.

14. A vehicle drive train for transferring torque from a power source to first and second sets of wheels, the drive train comprising:
a first driveline adapted to transfer torque from the power source to the first set of wheels and including a differential assembly, first hypoid gearset and a synchronized first disconnect clutch positioned between the differential assembly and the first hypoid gearset to selectively transfer or cease the transfer of drive torque from the power source to the first hypoid gearset; and
a second driveline having a second hypoid gearset in receipt of drive torque from the first hypoid gearset, the second driveline transferring drive torque from the second hypoid gearset to the second set of wheels and including a non-synchronized second disconnect clutch selectively interrupting the transfer of drive torque from the second set of wheels to the second hypoid gearset, the second driveline also including a friction clutch for transferring drive torque between the first hypoid gearset and the second hypoid gearset.

15. The vehicle drive train of claim 14 wherein the second driveline includes a drive axle including the second hypoid gearset, a second differential assembly, axle shafts and the non-synchronized second disconnect clutch, the second differential assembly including a carrier containing a pair of pinion gears in meshed engagement with a pair of side gears, the non-synchronized second disconnect clutch being positioned between one of the side gears and one of the axle shafts.

16. The vehicle drive train of claim 14 which is switchable from a two-wheel drive mode to a four-wheel drive mode by transferring drive torque first through the synchronized first disconnect clutch, next through the friction clutch and lastly through the non-synchronized second power disconnect clutch.

17. A method for transferring torque from a power source to a first pair and a second pair of wheels in a vehicle drivetrain, the method comprising:
transferring torque from the power source to the first pair of wheels;
actuating a first disconnect clutch to initially synchronize rotary speeds between and subsequently transfer torque from the power source to a driveline unit;
actuating a friction clutch to transfer torque from the driveline unit to a drive axle to initiate rotation of a gearset within the drive axle; and
actuating a second disconnect clutch to drivingly interconnect a shaft coupled to one wheel of the second pair of wheels and a rotatable member of the drive axle once speed synchronization between the components coupled by the first disconnect clutch is achieved.

18. A drivetrain for a motor vehicle having a power source and first and second set of wheels, the drivetrain comprising:
a first driveline adapted to transfer torque from the power source to the first set of wheels, the first driveline including a first differential assembly and a power take-off unit, the first differential assembly operably interconnecting the power source to the first set of wheels, the power take-off unit including an input shaft driven by the first differential assembly, a first hypoid gearset, and a first disconnect coupling operable for selectively connecting and disconnecting the first hypoid gearset to the input shaft;
a second driveline adapted to selectively transfer torque from the first hypoid gearset to the second set of wheels, the second driveline including a propshaft driven by the first hypoid gearset, a second differential assembly operably interconnected to the second set of wheels, a second hypoid gearset driving the second differential assembly, a torque coupling operable for selectively connecting and disconnecting the propshaft to the second hypoid gearset, and a second disconnect coupling operable for selectively connecting and disconnecting one of the second set of wheels to the second differential assembly; and
a control system for controlling actuation of the first disconnect coupling, the torque coupling and the second disconnect coupling for selectively switching the vehicle between a two-wheel drive mode and a four-wheel drive mode, wherein the control system is operable to shift the vehicle from the two-wheel drive mode into the four-wheel drive mode by sequentially actuating the first disconnect coupling to transfer torque from the power source to the propshaft through the first hypoid gearset, the torque coupling to transfer torque from the propshaft to the second differential assembly, and the second disconnect coupling to transfer torque from the second differential assembly to the second set of wheels.

19. A drivetrain for a vehicle, comprising:
a power source having a rotary output component;
a set of front wheels;
a front drive assembly including a drive gear driven by the rotary output component of the power source and a front differential assembly having a front differential input driven by the drive gear and a pair of front differential outputs driving the set of front wheels;
a set of rear wheels; and
a rear drive assembly switchable between a two-wheel drive (2WD) mode and an all-wheel drive AWD mode, wherein the rear drive assembly is operating in its 2WD mode when the power source only transmits drive torque to the front wheels, wherein the rear drive assembly is operating in its AWD mode when the power source transmits drive torque to the front wheels and the rear wheels, the rear drive assembly including a first hypoid gearset, a second hypoid gearset, a propshaft interconnecting an output of the first hypoid gearset to an input of the second hypoid gearset, a rear differential assembly having a rear differential input driven by an output of the second hypoid gearset and first and second rear differential outputs, a first disconnect clutch disposed between the drive gear and an input to the first hypoid gearset, a second disconnect clutch disposed between the first rear differential output and one of the rear wheels, and a third disconnect clutch disposed between the second rear different output and the other one of the rear wheels; and
a control system for controlling actuation of the first, second and third disconnect clutches to switch the rear drive assembly between the 2WD and AWD modes, wherein the 2WD mode is established when the first, second and third disconnect clutches are each in a disconnected, non-torque transferring state, and wherein the AWD mode is established by initially shifting the first disconnect clutch into a connected torque-transferring state while maintaining said second and third disconnect clutches in their disconnected, non-torque transferring states for synchronizing the rotary speed of the first hypoid gearset with the rotary speed of the drive gear and subsequently shifting the second and third disconnect clutches into their connected torque-transferring states.

20. The drivetrain of claim 19 wherein said rear drive assembly further includes a torque coupling disposed between the propshaft and the input to the second hypoid gearset, wherein said control system control actuation of said torque coupling, and wherein said torque coupling is shifted from a disconnected non-torque transferring state into a connected torque-transferring state following actuation of said first disconnect clutch and prior to actuation of said second and third disconnect clutches.

21. The drivetrain of claim 19 wherein said first disconnect clutch is a synchronizer clutch having a clutch sleeve moveable between first and second positions, the clutch sleeve is operable in its first position to disconnect the input of the first hypoid gearset from driven connection with the drive gear, and the clutch sleeve is operable in its second position to connect the input of the first hypoid gearset for driven connection with the drive gear.

22. A drivetrain for a vehicle, comprising:
a power source having a rotary output component;
a set of front wheels;
a front drive assembly including a drive gear driven by the rotary output component of the power source and a front differential assembly having a front differential input driven by the drive gear and a pair of front differential outputs driving the set of front wheels;
a set of rear wheels; and
a rear drive assembly switchable between a two-wheel drive (2WD) mode and an all-wheel drive AWD mode, wherein the rear drive assembly is operating in its 2WD mode when the power source only transmits drive torque to the front wheels, wherein the rear drive assembly is operating in its AWD mode when the power source transmits drive torque to the front wheels and the rear wheels, the rear drive assembly including an input shaft driven by the front differential input, a first hypoid gearset, a second hypoid gearset, a propshaft interconnecting an output of the first hypoid gearset to an input of the second hypoid gearset, a rear drive input component driven by an output of the second hypoid gearset, first and second rear drive output components driven by the rear drive input component, a first clutch disposed between the input shaft and the first hypoid gearset, a second clutch disposed between the first rear drive output component and one of the rear wheels, and a third clutch disposed between the second rear drive output component and the other one of the rear wheels; and
a control system for controlling actuation of the first, second and third clutches to switch the rear drive assembly between the 2WD and AWD modes, wherein the 2WD mode is established when the first, second and third clutches are each in a disconnected, non-torque transferring state, and wherein the AWD mode is established by initially shifting the first clutch into a connected torque-transferring state while maintaining the second and third clutches in their disconnected, non-torque transferring states for synchronizing the rotary speed of the first hypoid gearset with the rotary speed of the input shaft and subsequently shifting the second and third clutches into their connected torque-transferring states.

23. The drivetrain of claim 22 wherein the rear drive assembly further includes a torque coupling disposed between the propshaft and the input to the second hypoid gearset, wherein the control system controls actuation of the torque coupling, and wherein the torque coupling is shifted from a disconnected non-torque transferring state into a connected torque-transferring state following actuation of the first clutch and prior to actuation of the second and third clutches.

24. The drivetrain of claim 22 wherein the first clutch is a synchronizer clutch having a clutch sleeve moveable between first and second positions, wherein the clutch sleeve is operable in its first position to disconnect the input of the first hypoid gearset from driven connection with the input shaft, and wherein the clutch sleeve is operable in its second position to connect the input of the first hypoid gearset for driven connection with the input shaft.

* * * * *